F. E. STOVER.
ROTARY MOTOR.
APPLICATION FILED DEC. 27, 1917. RENEWED MAR. 22, 1919.
1,319,812.
Patented Oct. 28, 1919.
2 SHEETS—SHEET 1.
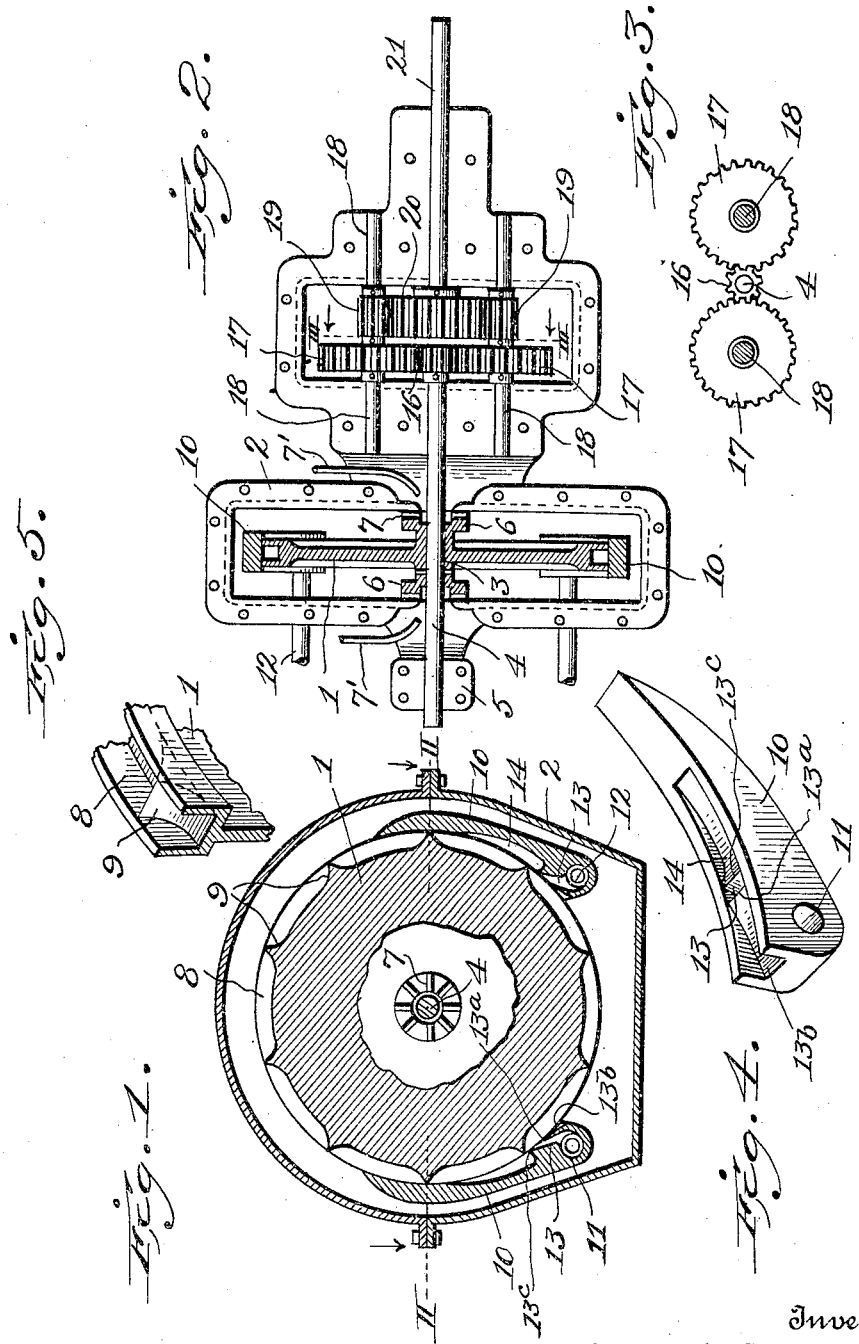
Inventor
Frank E. Stover
by Percy B. Hills
Attorney

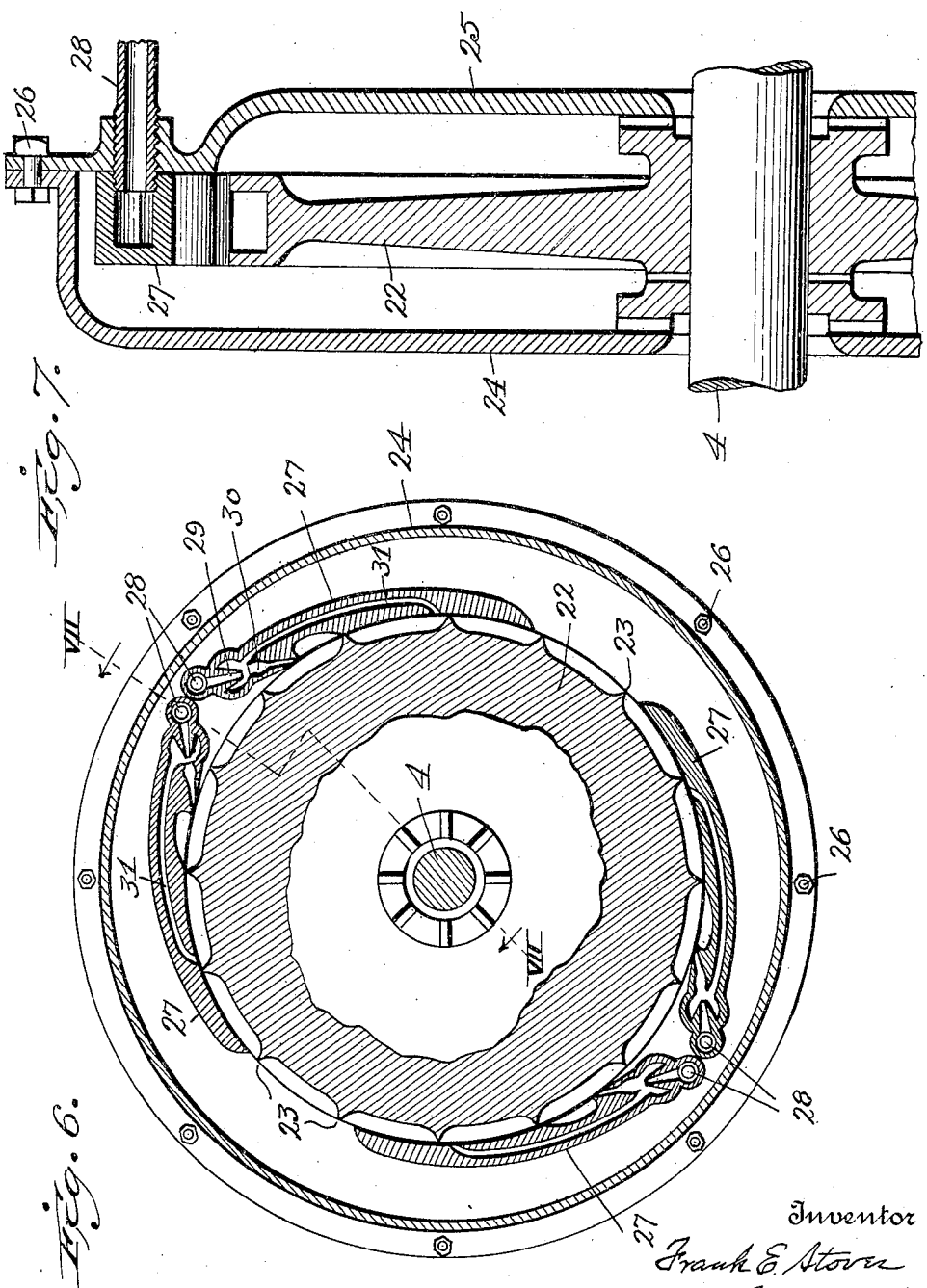

UNITED STATES PATENT OFFICE.

FRANK E. STOVER, OF LURAY, VIRGINIA.

ROTARY MOTOR.

1,319,812.     Specification of Letters Patent.     Patented Oct. 28, 1919.

Application filed December 27, 1917, Serial No. 209,157. Renewed March 22, 1919. Serial No. 284,517.

*To all whom it may concern:*

Be it known that I, FRANK E. STOVER, a citizen of the United States, residing at Luray, county of Page, State of Virginia, have invented certain new and useful Improvements in Rotary Motors, of which the following is a specification.

My invention relates to rotary motors, and more particularly to that type wherein steam is used as the motive power, and has for its primary object to provide an improved construction whereby the expansive force of steam will be utilized to the fullest degree without exerting back pressure upon the blades of the motor, and whereby the application of the steam jet to the motor blades will tend to create a partial vacuum to the rear of the point of application of the jet, whereby back pressure from that source will be eliminated.

A further object of my invention is to provide means for again utilizing the exhaust steam, thereby obtaining a compound effect in the rotation of the motor.

These objects I accomplish in the manner and by the means hereinafter described and claimed, reference being had to the accompanying drawing, in which:—

Figure 1 is a vertical longitudinal sectional view of my improved motor shown in its inclosing casing.

Fig. 2 is a horizontal sectional view of the motor and its gearing, taken on the line II—II of Fig. 1.

Fig. 3 is a detail sectional view, taken on the line III—III of Fig. 2.

Fig. 4 is an enlarged perspective view of one of the shoes through which the steam is applied to the channel wheel of the motor.

Fig. 5 is a detail perspective view of a portion of the channel wheel showing the channel groove therein and one of the blades.

Fig. 6 is a view similar to Fig. 1, illustrating a modified construction.

Fig. 7 is an enlarged detail sectional view, taken on the line VII—VII of Fig. 6.

Similar numerals of reference denote corresponding parts in the several views.

In the said drawings, referring more particularly to Figs. 1 to 5, the reference numeral 1 denotes my improved channel wheel, the same being inclosed in a conventional casing 2, and formed with a hub 3 whereby it is fixed to a shaft 4, mounted at one side in suitable bearings 5, and which passes freely through central apertures in the casing 2. In order to dispense with stuffing boxes at the points where said shaft passes through the casing 2, I provide the extension 6 of the hub 3 with a series of blades 7, which operate, when the channel wheel 1 is rotated, to force air into the interior of the casing 2, thereby opposing the escape of steam at that point and operating as effectually as would stuffing boxes, but eliminating the resultant friction of the latter. I also provide pipes 7' discharging toward the blades 7, through which water may be supplied; said water as it discharges being beaten into a fine spray by said blades 7 and serving to condense the steam within the casing 2.

The wheel 1 is provided in its periphery with an annular channel or groove 8, which is interrupted at intervals by the blades 9, the latter extending to the outer edge of the wheel 1, as best seen in Fig. 1, and being curved upon each side and terminating in thin edges which preferably are knife-edges, as shown. Mounted in the casing 2 upon each side of the channel wheel 1 is a shoe 10, the same being formed of a width preferably somewhat greater than the width of the channel wheel 1 at its periphery and being formed hollow and provided with a side orifice 11 adapted to receive a steam supply pipe 12, said orifice 11 communicating with a jet opening 13 disposed tangentially with respect to the wheel 1, as clearly shown in Fig. 1, and of the same width as that of said channel 8. The inner face of each shoe 10 is curved to conform to the periphery of the wheel 1, and just beyond the discharge point of the jet 13 is formed with a recess or pocket 14 coextensive in width with that of the annular channel 8 in the wheel 1, the same gradually decreasing in depth until it merges with the inner curved face of the shoe. The outer margin of the jet opening 13 is brought to a knife-edge at 13$^a$, and the inner face of the shoe 10 to the rear of said knife-edge preferably is cut away or recessed at 13$^b$, while the inner margin of said opening is knife-edged at 13$^c$, all for a purpose hereinafter to be described.

The operation of my improved construction is as follows:—Steam is admitted through one of the pipes 12 to the orifice 11 in its shoe 10 and discharges through the jet aperture 13 into the groove 8 in the wheel, thereby impinging upon the blade 9 in front of the same. If the latter has passed the edge 13ᶜ the steam jet exerting its dynamic force thereon not only will start the wheel 1, but also will expand into the chamber formed by the pocket 14 and the channel 8, and at once will exert its static force upon the next preceding blade 9, which will be past the pocket 14. Nor will there be any unbalanced back pressure on the blades 9, as that blade against which the steam jet is impinging is open to the static force of the steam on both sides, due to the pocket 14, the steam jet itself acting as an abutment for the rearward thrust of said static force, while the rear face of the blade in advance also is acted upon by said static force. Thus it will be seen that only while the blade edges register with the edge 13ᶜ will there be any effective back pressure on said blades, and as these periods are negligible in point of time the feature of back pressure is eliminated as a factor. If the wheel is to be started with a blade in register with or just in front of the edge 13ᶜ, the initial action of the jet will be dynamic only, and as the wheel presents no closed abutment to the rear of the edge 13ᵃ there will be no back pressure on the wheel.

From the foregoing it will be seen that my improved construction obtains the following advantages;—first, the prevention of back pressure in the pocket at the rear of the rear blade being acted on, which is especially important when the rotor is started, and until its peripheral velocity becomes that which is in tune with the velocity of the jet, and which has value, also, in case of a retardation of the velocity of the rotor below its normal velocity during operation; secondly, the provision of a constant inlet for aeriform fluid to keep the pockets full in case of an acceleration of the velocity of the rotor; and, thirdly, the provision of the pocket 14, whereby the cross section of the passage for the active steam is expanded, thus providing a free space for one abutment 9, whereby the static energy of the steam thereon will be balanced. It will be understood, also, that all other advantages not herein definitely recited which my improved construction may possess, are to be considered as included within the scope of the protection granted.

The shaft 4 of the wheel 1 is extended into a casing 15, which may be formed liquid-tight and contain oil or other lubricant, and said shaft at that end has fixed thereto a pinion 16, which is in constant engagement with the oppositely disposed larger gear wheel 17, mounted on suitable shafts 18 journaled in said casing 15. Also fixed to said shafts 18 are pinions 19, which are disposed upon opposite sides of a gear 20 fixed to a shaft 21 in alinement with the shaft 4, said shaft 21 being adapted to be connected with any machinery to be driven by the motor, in a manner readily understood. It will be seen that from this construction the thrust upon the shaft 4 is reduced to a minimum, its drive being imparted equally to its oppositely disposed gears 17, which in turn impart their thrust, through their pinions 19, equally upon opposite sides of the gear 20, the result being that the side thrust of the device as a whole is eliminated.

It will be understood that a shoe 10 is shown upon each side of the wheel 1, and with their jets pointing in opposite directions, purely for the purpose of providing means for reversing the motor, it being understood that steam is admitted to one of said shoes when it is desired to rotate the device in one direction, and to the other of said shoes when it is desired to reverse the motor. I also contemplate employing more than a single shoe 10 around the periphery of the wheel 1, and the number of shoes is dependent only upon the size of said wheel and number of blades. In fact an ideal arrangement would be to have shoes directing the steam the same way disposed diametrically opposite to each other, thus balancing the steam upon the wheel 1, it being understood that there will be with such a construction two other shoes diametrically opposite each other and at a 45° angle to the first-mentioned shoes and adapted to direct the steam in the opposite direction for a reversal.

I also contemplate dispensing with the bearing 5 for the shaft 4, and duplicating the casing 15 and its gearing upon the opposite side of the wheel 1, so that a more perfect balance of the device will be obtained.

In Figs. 6 and 7, I have shown a modified construction wherein the steam after having performed its initial expansive function, instead of being discharged into the casing, is led back and injected together with the live steam initially supplied, thereby obtaining a compound effect, substantially similar to that obtained in compound reciprocating engines. In said figures of the drawing, the shaft 4 has mounted thereon a channel wheel 22, similar to the channel wheel 1 except that its blades 23 are placed somewhat closer together than are the blades 9 of said wheel 1. The said wheel is mounted in a casing formed by two members 24, 25, connected together by means of bolts 26, and having mounted therein a plurality of shoes 27, which are adapted to perform all of the functions of the shoes 10, and in addition thereto a function hereinafter to be described. I have shown in Fig. 6 four of said shoes, the same being oppositely disposed in pairs, and being intended to be utilized in pairs to drive the wheel 22 in either direction as desired, as readily will be understood. Tapped through the wall 25 of the casing and into each of the shoes 27 is a steam supply pipe 28, communicating with an injector jet 29, that in turn directs the steam into the enlarged end of a jet 30, which discharges into the groove of the wheel 22 in a manner identical with that of the jet opening 13 of Fig. 1. Also formed in each of the shoes 27 is a passage 31, the same extending from a point part way along the interior wall of said shoe to the injector jet 29. The operation of this construction readily will be understood as follows:—The steam admitted through the pipes 28 upon opposite sides of the wheel to either pair of shoes 27 for rotating the wheel in either direction, will discharge from their injector jets 29 into the jets 30 and will operate on the blades 23 of the wheel 22 in a manner identical with that of Fig. 1. But as the steam so discharged into the groove of the wheel 22 exerts its expansive force upon the blade in front of it, and moves said blade to uncover the opening of the channel 31, said steam will escape through said channel back to and around the injector jet 29, and will be injected by said jet into the groove of the channel wheel 22, thereby utilizing any expansive force in said steam not already exhausted.

Having thus described my invention, what I claim as new and desire to secure by Letters Patent, is:—

1. A rotary motor, comprising a wheel formed with a peripheral channel, blades spaced at intervals therein, and a shoe shaped to fit and cover the channel in said wheel and of a length in excess of the distance between adjacent blades therein, said shoe having a steam inlet discharging tangentially into said channel and being open at the rear of said point of inlet discharge.

2. A rotary motor, comprising a wheel formed with a peripheral channel, blades spaced at intervals therein, and a shoe shaped to fit and cover the channel in said wheel and of a length in excess of the distance between adjacent blades therein, said shoe having a steam inlet discharging into said channel and being open to the rear of said point of inlet discharge and formed into a recess or pocket immediately in front of said inlet discharge.

3. A rotary motor, comprising a wheel formed with a peripheral channel, blades spaced at intervals therein, and a shoe shaped to fit and cover the channel in said wheel and of a length in excess of the distance between adjacent blades therein, said shoe having a steam inlet discharging into said channel and being open to the rear of said point of inlet discharge and formed into a recess or pocket immediately in front of said inlet discharge, said recess or pocket being of equal width with said channel.

4. A rotary motor, comprising a wheel formed with a peripheral channel, blades spaced at intervals therein, and a shoe shaped to fit and cover the channel in said wheel and of a length in excess of the distance between adjacent blades therein, said shoe having a steam inlet discharging into said channel and being open to the rear of said point of inlet discharge and formed into a recess or pocket immediately in front of said inlet discharge, said recess or pocket being of equal width with said channel and of equal depth at its point nearest said steam discharge but gradually becoming shallower until it vanishes.

5. A rotary motor, comprising a wheel formed with a peripheral channel, knife-edged blades spaced at intervals therein, and a shoe shaped to fit and cover the channel in said wheel and of a length in excess of the distance between adjacent blades therein, said shoe having a steam inlet discharging tangentially into said channel and being cut away to the rear of said inlet discharge to leave a knife-edge at the inner margin of said inlet discharge.

6. A rotary motor, comprising a wheel formed with a peripheral channel, blades spaced at intervals therein, and a shoe shaped to fit and cover the channel in said wheel and of a length in excess of the distance between three adjacent blades therein, said shoe having a steam inlet discharging tangentially into said channel, and having a steam passage leading from a point intermediate its length to a point surrounding said steam inlet.

7. A rotary motor, comprising a wheel formed with a peripheral channel, blades spaced at intervals therein, and a shoe shaped to fit and cover the channel in said wheel and of a length in excess of the distance between three adjacent blades therein, said shoe having a steam inlet discharging tangentially into said channel, and being open at the rear of said point of inlet discharge, and having a steam passage leading from a point intermediate its length to a point surrounding said steam inlet.

8. A rotary motor, comprising a wheel formed with a peripheral channel, blades spaced at intervals therein, a shoe shaped to fit and cover the channel in said wheel and of a length in excess of the distance between three adjacent blades therein, and an injector jet in said shoe discharging tangentially into said channel, said shoe being open at the rear of the point of inlet discharge, and having a steam passage leading from a point intermediate its length to a point surrounding said jet.

9. A rotary motor, comprising a wheel formed with a peripheral channel, blades spaced at intervals therein, a shoe shaped to fit and cover the channel in said wheel and of a length in excess of the distance of three adjacent blades therein, and a steam inlet discharging into said channel and being open to the rear of said point of inlet discharge and formed into a recess or pocket immediately in front of said inlet discharge, said shoe having a steam passage leading from a point intermediate its length to a point surrounding said jet.

In testimony whereof, I hereunto set my hand this 21st day of December, 1917.

FRANK E. STOVER.

Copies of this patent may be obtained for five cents each, by addressing the "Commissioner of Patents, Washington, D. C."